Dec. 24, 1935.  E. A. JOHNSTON  2,025,513
SELF PROPELLED VEHICLE
Filed Oct. 18, 1934   3 Sheets-Sheet 1

Inventor
Edward A. Johnston
By V. F. Lassagne
Atty.

Dec. 24, 1935.  E. A. JOHNSTON  2,025,513
SELF PROPELLED VEHICLE
Filed Oct. 18, 1934   3 Sheets-Sheet 2

Inventor
Edward A. Johnston
By V. F. Lemagne
Atty.

Dec. 24, 1935.  E. A. JOHNSTON  2,025,513
SELF PROPELLED VEHICLE
Filed Oct. 18, 1934    3 Sheets-Sheet 3
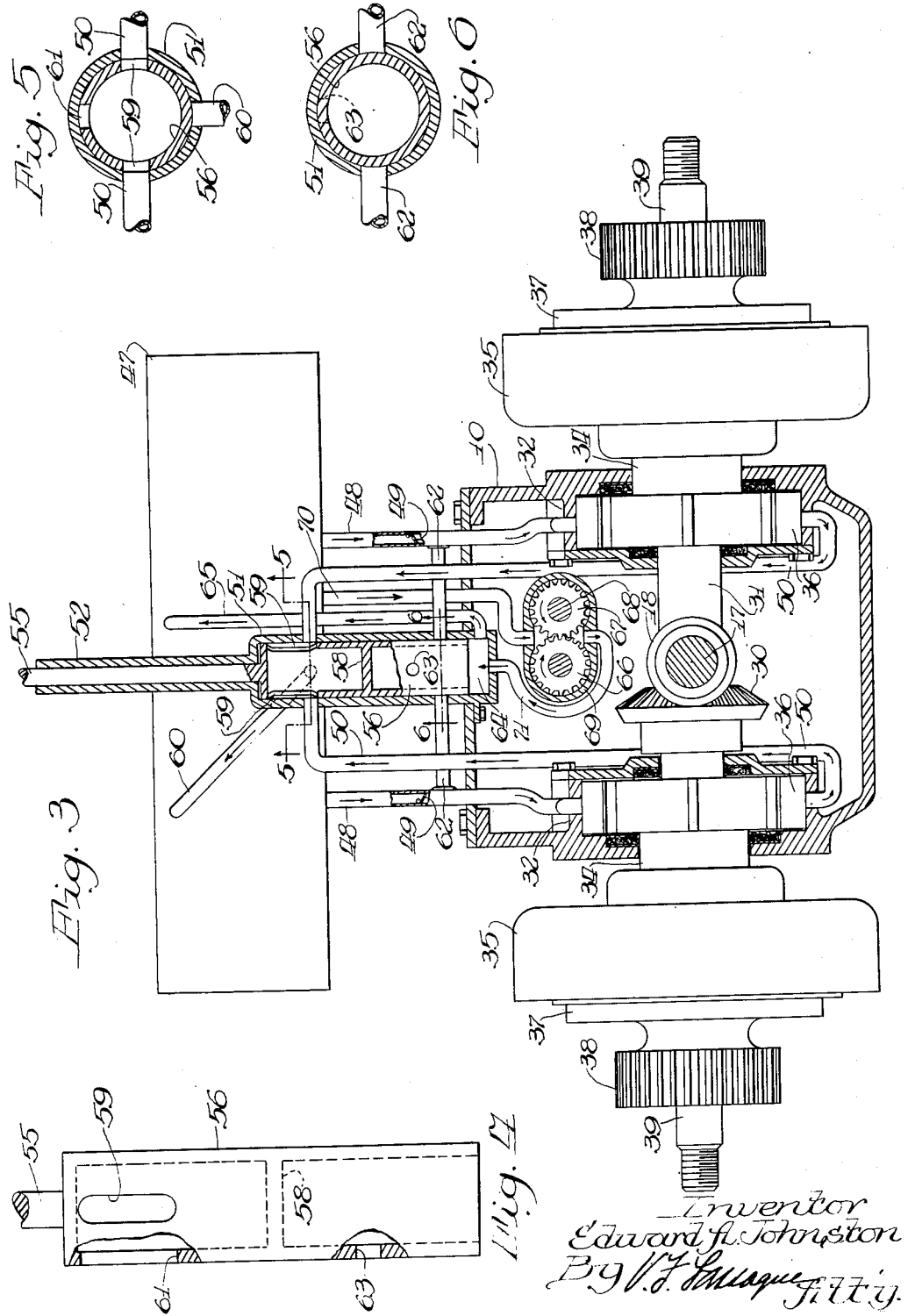

Patented Dec. 24, 1935

2,025,513

UNITED STATES PATENT OFFICE 2,025,513

SELF-PROPELLED VEHICLE

Edward A. Johnston, Chicago, Ill., assignor to International Harvester Company, a corporation of New Jersey Application October 18, 1934, Serial No. 748,809

11 Claims. (Cl. 180—9.2)

The invention relates to an improved driving and steering control mechanism for endless track type tractors.

These tractors embody an endless track at each side of a central body. The motor delivers power through a change speed gear set which in turn delivers power to a final drive mechanism. Such final drive distributes the power to each of the tracks and includes, in a common form, a planetary gear set for each track to enable the tracks to be driven independently for steering movements. Friction clutches, or brakes, are usually associated with each planetary gear set to control the gears and enable steering. Such friction controls are objectionable in that they heat up and wear out rapidly when allowed to slip, and since slippage is an essential characteristic of this system of steering control, such friction devices are inherently faulty. Further, such slippage makes for jerky turning movements; uncomfortable riding qualities; and uneven drawbar pull on short turns.

To overcome these difficulties the present invention provides a hydraulic system including means for interrupting delivery of power through the planetary gear sets to effect steering control. The hydraulic control enables the planetary gear sets, individually and independently, to be made operative or inoperative, as desired, for steering purposes.

The main object of the invention is to provide an improved control mechanism for tractors of this type which will afford the driver a more perfect steering control with a minimum of driver effort, and thus generally enhance the usefulness and maneuvering qualities of such tractors.

Another object is to eliminate friction clutches and friction brakes now commonly employed in these tractors to effect steering.

Still another object is to provide an improved steering control which will result in the maintenance of a smooth drawbar pull, even on short turns.

Other important objects will become apparent to those skilled in this art as the disclosure is more fully made.

In the practicable example of the invention chosen for purposes of illustration, a rotary hydraulic pump is associated with each planetary gear set, in lieu of the usual friction clutch or brake device. Each pump has a suction port connected to a source of fluid supply and a delivery port leading back to said source of supply. A throttling valve in the fluid delivery line for said pumps provides a means for controlling the amount of torque required to drive each pump. When the throttle valve is completely closed the rotation of the associated pump would be prevented, and the adjacent planetary gear set would deliver its maximum rotative speed to its own power output shaft. With both planetary gear sets so controlled, both propelling tracks of the tractor would run at the same speed and the tractor would tend to run in a straight path.

By fully opening a port in the throttle valve, the associated pump would turn free and offer little, if any, restriction to the natural tendency of the internal gear of the associated planetary gear set to rotate. Thus, no power is transmitted through the planetary set to the associated track. With both planetary gear sets freed in this fashion, the tractor would stand still. Now, between these extremes of maximum speed down to zero speed any desired forward speed of the tracks may be obtained depending upon the amount of throttling. In other words, each of these two pumps acts as a hydraulic clutch and as oil is preferably used as the motive fluid, these pumps would be perfectly lubricated and free from wear. By proper fluid throttling and control of the two planetary gear sets, ordinary turns can be effected.

During steering, one track is driven through its planetary gear set while the other is made idle. The driven track then turns the tractor toward the idle track. However, the idle track in practice tends to creep ahead and makes for difficulty in accomplishing a short turn. Accordingly, a third pump, suitably driven from the transmission, is so connected that the fluid, or oil, delivered by it may be turned into the suction port of either of the other two pumps associated with the planetary gear sets. By thus routing the fluid to one of the steering control pumps the said pump acts as a fluid motor to drive the floating internal gear ring of the adjacent planet gear set, causing it to overrun in the same direction it was already turning. When this over-running reaches the same speed that would occur if the track were held from turning, said track will stop creeping ahead and, hence, as the other track is being positively propelled, a pivot or short turn will result. If this fluid drive over-running is carried beyond the speed just mentioned, the track to which it is connected will rotate in a reverse direction to achieve a perfect short turn.

All pipe lines for transmitting the fluid are connected to a manually controllable, unitary or common valve properly ported to afford the operator the necessary throttling control for all steering movements as desired.

With this brief introduction giving a general survey of the invention, reference should now be made to the accompanying sheets of drawings illustrating a desirable form of this structure. In these drawings:

Figure 3 is a vertical cross sectional view through the control mechanism, taken along the line 3—3 of Figure 1, looking in the direction of the arrows;

Figure 4 is a side view of the piston per se, of the common control valve structure;

Figure 5 is a transverse cross sectional view of the control valve structure taken along the line 5—5 of Figure 3 looking in the indicated direction; and Figure 6 is a similar view taken along the line 6—6 of Figure 3 looking in the same direction.

Figure 1:
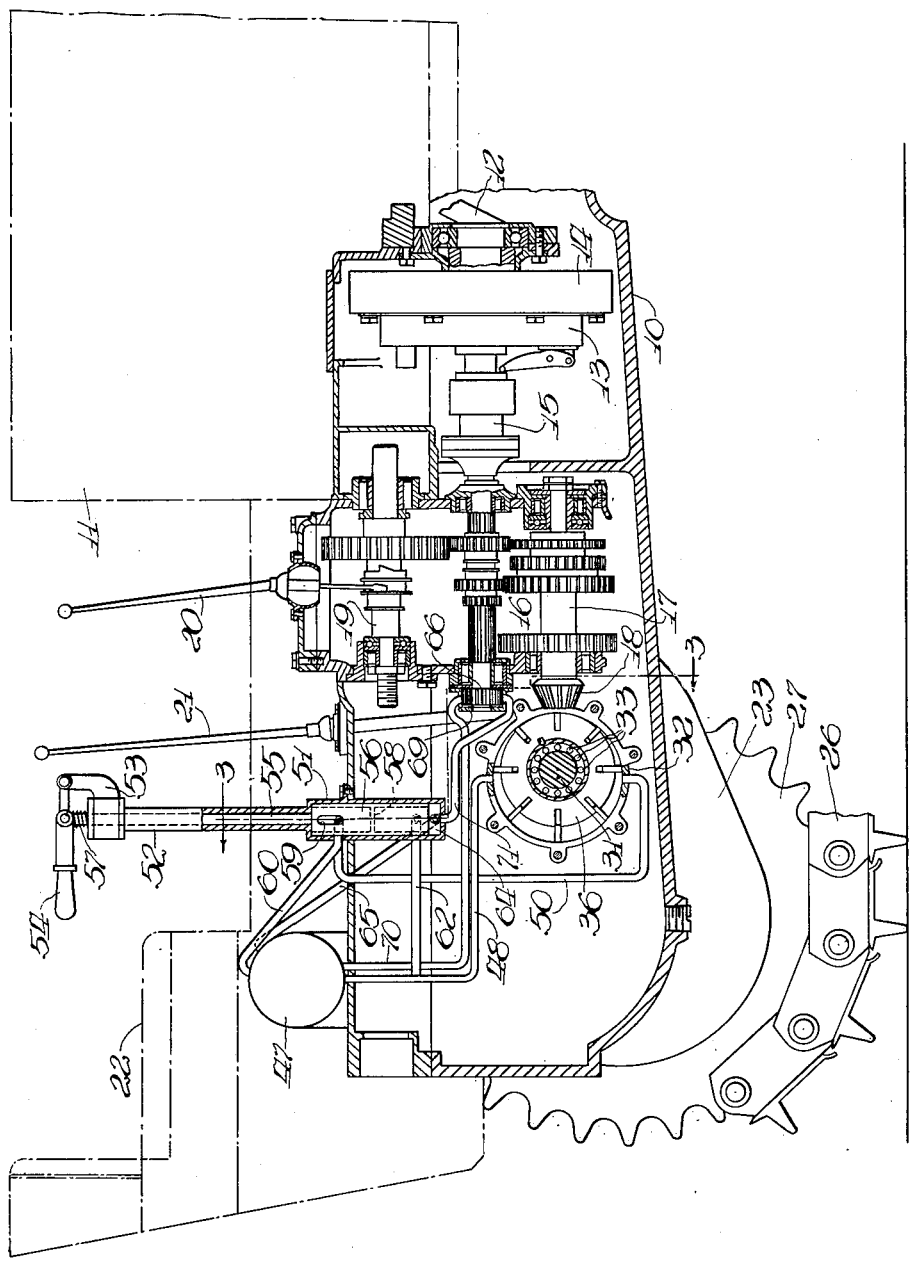
Figure 1 is a longitudinal central sectional view through a track-type tractor embodying the hydraulic steering and driving control of this invention.

The track-type tractor with which the present invention is associated is of any conventional form and embodies the usual longitudinally disposed, central body, or frame, 10, carrying at its front end a power plant, or engine, 11, having a crank shaft, shown at 12 in Figure 1. This crank shaft 12 connects in the usual way through a master or engine clutch 13 with the engine fly wheel 14. The clutch shaft 15 delivers the engine power to a conventional three-speed forward, and one-speed reverse, sliding gear change speed gear set 16. These gears 16 deliver the power to the driven shaft 17 carrying at its rear end a bevel pinion 18.

Above the change speed gear set, and driven therefrom, is a power take-off shaft 19 connectible with the gear set 16 by means of the usual shifter lever 20. The selection of gear speeds in the set 16 is accomplished by the shift lever 21. Both levers 20, 21 are in the usual accessible position with respect to a driver's seat 22 carried on the rear end of the body 10.

On each side of the body 10, at its rear, are side housings 23 (see Figure 2) which at their outward, forward sides carry brackets 24 for mounting the rear end of the tractor body in the conventional way on the usual side truck frames 25 which, as is well known in the art, embody track rollers, not shown, traveling on the ground stretch of endless track belts 26.

There is, of course, one such track belt at each side of the body 10, the rear looped ends of each passing around driving sprocket wheels 27. Each track-propelling wheel 27 is mounted on the projected outer end of transversely aligned power output shafts, or stub axles, 28. Each shaft 28 turns with its sprocket wheel 27 and is appropriately carried and journaled in a cover 29 for the adjacent housing 23, in the manner shown in Figure 2.

The pinion 18 meshes with and drives a bevel gear 30 (see Figure 2) on a transverse power distribution shaft 31. On either side of the gear 30 the shaft passes through a pump housing 32, said housings 32 being appropriately secured to the side walls of the tractor body 10. Within each housing 32 is a bearing 33 on which is rotatably journaled the laterally extending hub 34 of an internally cut ring gear 35 located within the housing 23. Inside each housing 32 a sliding vane type of pump impeller 36 is keyed to the external portion of the hub 34, so that when the hub 34 turns the pump also turns therewith. This pump impeller is well shown in Figure 1.

Figure 2:
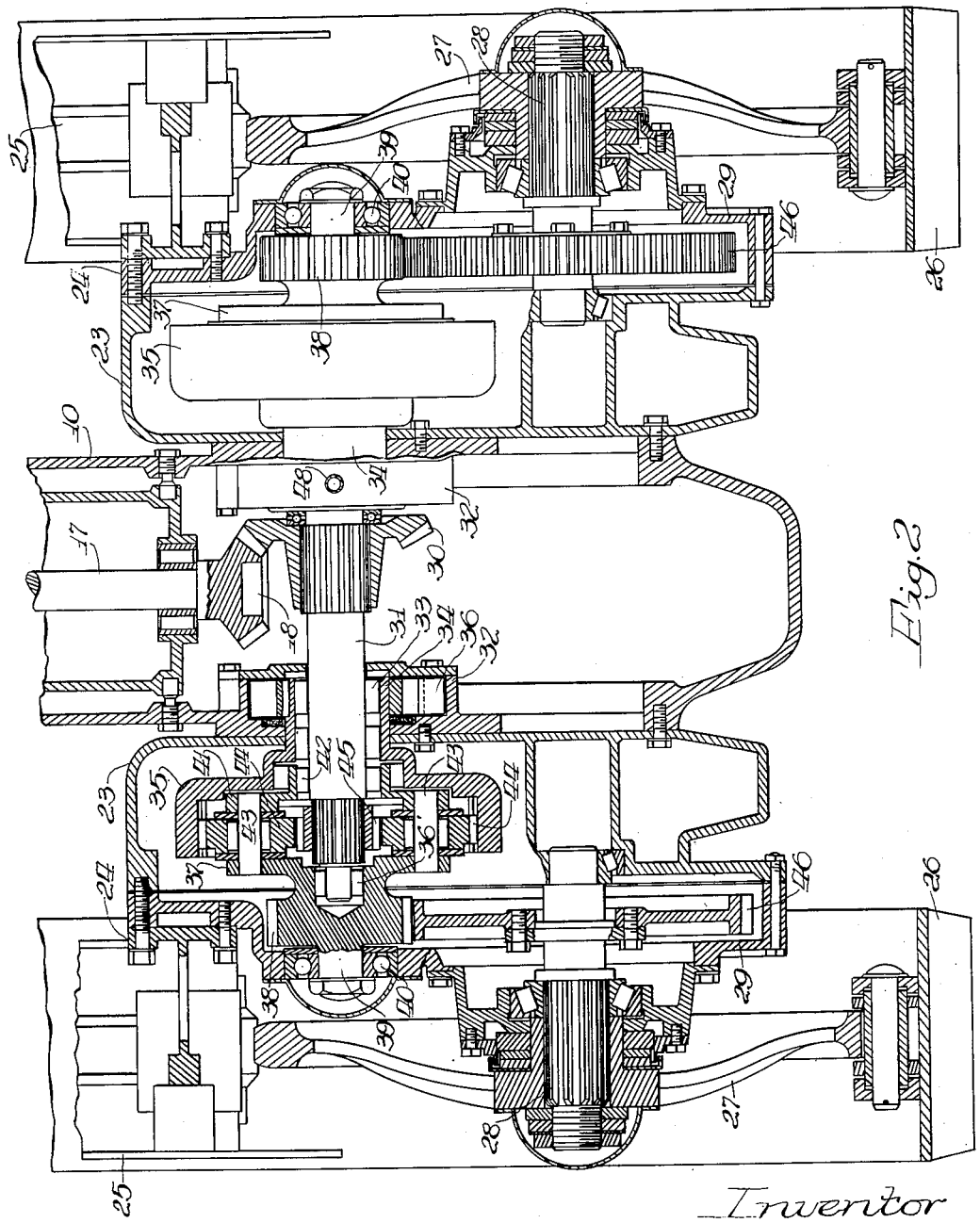
Figure 2 is a horizontal sectional view through the final drive gearing showing the manner of dividing and distributing the power to the track-propelling sprocket wheels.

The opposite ends of the cross shaft 31 extend into and through the ring gear member 35, as shown in Figure 2. The ends of the shaft are piloted in bearings 36' in the extension 37 of a spur gear 38, said gear 38 having an outwardly extending trunnion 39 carried in a bearing 40 mounted, as shown, in the cover 29.

The extensions 37 just described comprises an outer planet carrier element; an inner planet carrier element being shown at 41 having a hub extension turnably mounted on bearings 42. These carrier plates 37, 41 carry the usual three regularly spaced pins 43 (although two are only shown) on each of which is mounted a planet or orbit spur pinion 44 in mesh with the central sun spur gear 45, splined onto the shaft 31 to turn therewith. The relatively small gear 38 meshes with a larger reduction spur gear 46 on the power output stub axle shafts 28 already described.

A suitable tank 47 located on the body 10 below the seat 22 serves as the source of fluid supply, the fluid contained therein preferably being a satisfactory oil. From this tank lead a pair of downwardly extending pipe lines 48 (see Figures 1 and 3), each pipe 48 communicating through the top of the adjacent pump chamber 32 with the pump 36 contained therein. Each pipe 48 contains a one-way check valve 49 so that the oil may be passed downwardly to the pump as shown by the arrows in Figure 3, but cannot be moved upwardly. Out of the lower end of each chamber 32 leads a discharge pipe line 50 to lead the oil from the chambers 32, at times, upwardly to a vertical cylinder 51 mounted appropriately on the tractor body 10.

The cylinder 51 embodies an upright standard 52 carrying at its upper end a bracket 53 to which is pivoted a control, or throttling handle lever 54. Between the fulcrum and the handle part, a stem 55 is pivoted to the lever, said stem being slidably mounted in the standard 52 and being connected at its lower end with a master control piston type valve 56 which is turnable and axially movable in said cylinder 51. A spring 57 encircles the stem 55 between the collar portion of the bracket 53 and the lever 54 to exert a force which normally holds the stem 55 and valve 56 in its up position in the cylinder 51, as shown in Figure 3.

This piston valve 56 is hollow as shown in Figures 3 and 4 and is divided by a partition 58 into an upper chamber and a lower chamber as shown. Along a diametric line opposite sides of the upper portion of the piston valve 56 are provided with vertically elongated ports 59, the pump discharge pipes 50 respectively leading into the cylinder 51 adjacent said ports 59 so that communication therewith may at times be established. A by-pass pipe 60 connects between the cylinder wall 51 and the tank 47 (see Figure 5) from the upper valve compartment to return oil into said tank 47 as shown by the arrow. An elongated port 61 in line horizontally with the lower end of the ports 59 is also provided in the upper part of the piston valve 56, said port 61 being spaced substantially 90 degrees from said ports 59, as shown in Figure 5. When the piston is rotated on its axis the port 61 may establish communication with either of the pipes 50 as will later appear.

Cross communication between the lower end of the cylinder 51 and the pipes 48 is established by cross pipes 62 which connect below the check valves 49, as shown in Figure 3. Above these pipes 62 and at a right angle thereto, the piston 56 has a port 63 in its lower compartment, which port 63 is adapted to establish communication with either pipe 62 when the piston valve 56 is turned on its axis and bodily shifted downwardly. The cylinder 51 is longer than the piston 56 to permit such movement. This cylinder space is shown at 64. A return flow pipe 65 leads from this space 64 to the tank 47 as shown.

A hydraulic pump motor is provided to cause forced circulation of the oil for positively driving one or the other of the floating internal ring gear elements of the planetary gear sets, whereby to cause an overrunning action that will prevent creepage of the track which is not being driven ahead during steering. In fact, such track may actually be driven rearwardly by this pump motor to insure smooth, sharp, pivot turns.

Accordingly, as shown in Figures 1 and 3, the longitudinal countershaft of the change speed gear set 16 is protruded rearwardly to enable the mounting on its rear projected end, of a gear element 66, in mesh with a second gear element 67 on a stub shaft 68. These gear elements are housed in a housing 69. The structure just described constitutes a gear pump or fluid motor, its housing 69 having an intake pipe 70 leading from the tank 47, and a discharge pipe 71 leading therefrom, as shown in Figure 3, to the lower end of the cylinder 51 and into the space 64 therein. Having now described all of the structural parts, a résumé of the use and operation thereof will next be given.

In the normal operation of the improved tractor for straight-ahead movement, the control valve piston 56 is turned by the handle 54 to the position shown in Figure 3, the spring 57 serving to hold the piston 56 against the top of its cylinder 51, as shown. In this position the two elongated ports 59, 59 communicate with the two pipes 50, 50, respectively. Thus, communication is established between the upper compartment of the unit control valve 56 and the lower ends of the two pump housings 32. Oil feeds by gravity through the pipes 48, 48, past the check valves 49, 49 into the upper ends of the pump housings 32.

When the change speed set 16 is in gear mesh for a forward drive the gear 18 drives the cross, power distribution shaft 31 through the gear 30. The shaft in turn operates sun gears 45 of each planet gear set, and turns the planet gears 44 which merely run idly and do not for the time being transmit torque to the ring gears 35. Consequently, no drive is imparted to the sprocket wheels 27 for the time being. As soon as the pump housings 32 are full of oil, a static fluid pressure exists as the oil is confined in a closed space, so to speak, between the pumps and the control valve 56 which is set as shown in Figure 5.

The static pressure of the fluid confined in the pump housings 32 acts as a clutch to hold the rotary vane type pumps 36 therein against rotation. Consequently, the floating ring gear elements 35 of the planet gear sets are locked by fluid pressure as they are in connection with the pumps 36. Therefore, the carriers 37, 41 rotate to drive the gear 38 which in turn drives the power output shafts 28 on each side of the tractor and the sprocket wheels 27 mounted thereon. Thus, are the two tracks 26 driven for straight ahead movement. Any leakage of oil in either of the pump motors 36 and resultant slippage therefrom, is equalized through the direct communication of both pressures through the pipes 50 and the interior of the upper compartment of the valve piston 56.

When a steering turn is to be effected, the operator operates the handle 54 to turn the valve 56 in the direction in which it is desired to turn or steer the tractor. If the turn as viewed by the driver in the seat 22, is to the right the valve 56 is turned clockwise, or to the right, as shown in Figure 5, through an arc or angular distance of not more than 90 degrees. This brings the right hand port 59 into communication with the by-pass pipe 60 and the port 61 into communication with the right hand pipe line 50. At this instant the solid part of the piston valve 56 closes off the left hand pipe line 50, which latter line 50 retains the static fluid pressure. It follows then that the left hand ring gear 35 remains locked and the adjacent track 26 is driven just as when the tractor was moving straight ahead. With port 61 thus communicating with the right hand pipe 50, the oil enters the hollow upper end of the piston 56. The right hand pump 36 turns and circulates the oil from the tank 47, down the right hand pipe 48 through said pump 36, up the associated pipe 50, through port 61, valve 56, up the by-pass pipe 60 and back into the tank 47. In other words, the fluid control on the right hand side is such as to circulate the oil and remove the static pressure thereof from the right hand pump 36. For an instant the associated ring gear 35 turns and then the ground resistance of the right hand track causes the right hand track to come to a halt. As the left hand track is in the meanwhile being driven, the tractor turns in its course of travel to the right.

Without actual operating experience with track-laying tractors, one would naturally conclude that when the driving torque to one of the propelling tracks is completely interrupted or shut off, as above described, that that track would stand still or stop rotating, and, with the opposite track still driving, that the tractor would turn sharply or pivot on the idle track. Such is not the case, but on the contrary, the idle track, even though not receiving any turning effort from the engine, still tends to rotate, at reduced speed, of course, for it is dragged ahead by the other track which is still driving. Such creepage militates against the ability of the tractor to make a sharp turn when desired.

For the purpose of making such sharp pivot turns, the gear pump 66, 67 is utilized, which pump is always driven by the one direction turning countershaft of the change speed gear set 16. Normally, on straight-ahead operation, or on long turning movements, the pump 66, 67 merely circulates oil by drawing it from the tank 47 through the pipe 70, forcing it into the discharge pipe 71, through the space 64 at the lower end of the cylinder 51 and thence through the pipe 65 and back into the tank 47.

Now, when it is desired to make a sharp or pivot turn in the right hand direction, the valve 56, already turned 90 degrees for the ordinary turn, as above described, is now pushed bodily or axially downwardly by depressing the lever 54. Thus, the lower end of the control valve 56 takes up or occupies the space 64 to close off the by-pass pipe 65, and moving the port 63 already turned into registry with the right hand pipe 62. At the same time, because of the length of the right hand port 59, said port 59 is still in communication with the by-pass 60 and because of the length of port 61, said port 61 is in communication with the right hand pipe 50 thus still allowing the previously described circulation of oil between the right hand pump motor 36 and the tank 47.

With the piston valve 56 in the position just described, the port 63 communicates with the right hand pipe 62 and the gear pump 66, 67 forces the oil into the right hand vane pump 36. The check valve 49 prevents return of the oil thus being force circulated to the tank 47. When the gear pump 66, 67 forces the oil through the lower compartment of the valve 56, through the port 63, into line 62 and line 48 to the right hand valve pump motor 36, said pump is hydraulically driven and speeded up. Consequently, the ring gear element 35 coupled with said vane pump motor is caused to overrun the planet gears 44 which it surrounds, causing the associated sun gear 45 actually to reverse and deliver power to the associated right hand sprocket wheel 27 and track 26 in a reverse direction. Thus, the track on the right hand side is driven backwardly, while the left hand track drives forwardly. As a result, the tractor turns toward the right sharply, pivoting about its own center. In other words, when this over-running reaches the same speed that would occur if the track were held from turning, said track stops its creeping and a pivot turn follows. If this over-running is carried beyond this balancing speed just mentioned, the track to which it is connected is actually caused to rotate in a reverse direction to augment the sharp turning action.

If it is desired to make a left hand turn, then obviously the same procedure of controlling the fluid circuits is followed, except, of course, that the unitary control valve 56 is turned to the left.

It can now be seen that the speed of either tractor device 26 may be varied, independently of the other, from maximum speed to zero speed. This is accomplished by the control valve 56, when the same is in its down position, in which position the said valve 56 is turnable right or left about its axis to align the port 63 with either the right or left hand pipe 62, connecting the gear pump 66, 67 with either the right or left hand vane pumps 36 for driving said pumps in a reverse direction. It is obvious that to vary the alignment or registration of the port 63 with either of the pipes 62 is to vary the flow or volume of the control fluid between the pump 66, 67 and the respective vane pumps 36, thereby controlling the speed of the latter and the operatively associated tractor devices.

It is worthy of note that with the steering mechanism here disclosed, when one track is slowed down or completely stopped, no change in speed of the other track occurs. A still more important feature is that when a pivot-turn is produced by the method here disclosed, the torque reaction resulting is actually transferred to the other track, thereby contributing additional power to effect the turn.

From this disclosure it will now be seen that an improved tractor steering control has been provided which achieves all of the desirable objects heretofore recited.

It is the intention to cover all changes and modifications which do not depart from the spirit and scope of the invention.

What is claimed is:

1. In a self-propelled vehicle, a pair of traction devices by which the vehicle is supported and steered, transmission means therefor including a planetary gear set for each traction device, a hydraulic lock or release means associated with each planetary gear set to control the operation and steering of said traction devices, and a fluid motor driven from an element of the transmission means for driving one or the other of said hydraulic lock or release means to cause overrunning of the associated planetary gear set for short-turn steering movements of the vehicle.

2. In a self-propelled vehicle, a pair of traction devices by which the vehicle is supported and steered, transmission means therefor including a planetary gear set for each traction device, a fluid pump associated with each planetary gear set, each pump being in a fluid line communication with a source of fluid supply and serving to lock or unlock the planetary gear sets, a third fluid pump in circuit with the source of supply and with the other two pumps, and means to drive the third pump from an element of the transmission to cause operation of one or the other of the other two pumps to overrun the associated planetary gear sets for steering control of the vehicle.

3. In a self-propelled vehicle, a pair of traction devices by which the vehicle is supported and steered, transmission means therefor including a planetary gear set for each traction device, a hydraulic lock or release means associated with each planetary gear set to control the operation and steering of said traction devices, a fluid motor driven by the transmission means for driving one or the other of said hydraulic means to cause overrunning of the associated planetary gear set for short-turn steering movements of the vehicle, a common source of fluid supply for the hydraulic means and fluid motor including conduits, and a unitary operator controlled valve for controlling the flow of fluid as desired.

4. In a self-propelled vehicle, a pair of traction devices by which the vehicle is supported and steered, transmission means therefor including a planetary gear set for each traction device, a hydraulic lock or release means associated with each planetary gear set to control the operation and steering of said traction devices, a fluid motor driven by the transmission means for driving one or the other of said hydraulic means to cause overrunning of the associated planetary gear set for short-turn steering movements of the vehicle, a common source of fluid supply for the hydraulic means and fluid motor including conduits, and a unitary operator controlled piston valve having axially shiftable and rotatable movement for controlling the flow of fluid as desired.

5. In a tractor, a pair of traction devices by which the tractor is driven and steered, power transmission mechanism therefor, each device including a set of epicyclic gears to drive either traction device at variable speeds without varying the speed of the other, a hydraulic clutch operatively associated with each of said last mentioned sets of gears, and a fluid motor for driving either of said hydraulic clutches to cause overrunning of the associated set of gears.

6. In a tractor, a pair of traction devices by which the tractor is driven and steered, power transmission means therefor, a planetary gear set for each traction device, a hydraulic clutch associated with each planetary gear set to control operation thereof, and a fluid motor to drive either clutch to cause overrunning of the associated planetary gear set.

7. In a tractor, a pair of traction devices by which the tractor is driven and steered, power transmission means therefor, a planetary gear set for each traction device, a hydraulic clutch comprising a rotary vane type pump associated with each planetary gear set to control operation thereof, and a fluid motor comprising a gear pump to drive either clutch independently to cause overrunning of the associated planetary gear set.

8. In a tractor, a pair of traction devices by which the tractor is driven and steered, power transmission means therefor, planetary gear set for each traction device, a source of fluid supply, a hydraulic clutch associated with each planetary gear set, said clutches being in fluid circuit with said source of supply, means to control fluid passage to either clutch to lock or unlock the associated planetary gear set, a fluid motor driven from an element of the power transmission, means establishing a fluid circuit for said motor between the source of supply and either clutch whereby the fluid motor may drive either clutch to cause overrunning of the associated planetary gear set, and valve means to control the passage of fluid to the clutches and motor.

9. In a tractor, a pair of traction devices by which the tractor is driven and steered, power transmission means therefor, a planetary gear set for each traction device, a hydraulic clutch associated with each planetary gear set to control operation thereof, a fluid motor to drive either clutch to cause overrunning of the associated planetary gear set, a source of fluid supply, fluid circuits between said source of supply and the clutches and motor, and a common valve for controlling the flow of fluid to the clutches and motor.

10. In a self-propelled vehicle, a pair of traction devices for supporting and steering the vehicle, transmission means therefor, including a pair of planetary gear sets, fluid pressure means associated with each planetary gear set to maintain said planetary gear set at constant speed, means for controlling the fluid pressure means to vary the speed of the planetary gear sets, a fluid motor to drive either planetary gear set to cause overrunning thereof, and means to control operation of the fluid motor.

11. In a self-propelled vehicle, a pair of traction devices for supporting and steering the vehicle, transmission means therefor, including a pair of planetary gear sets, controllable fluid pressure operated means to resist the movement of one part of each planetary gear set whereby to vary the speed of either traction device and a controllable fluid motor to drive said part of each planetary gear set to cause overrunning thereof to vary the relative speeds of the traction devices still further

EDWARD A. JOHNSTON.